United States Patent
Cohn

(10) Patent No.: US 8,917,834 B2
(45) Date of Patent: Dec. 23, 2014

(54) TERMINAL AND METHOD FOR OFFERING TERMINATION-SIDE SERVICES

(75) Inventor: Daniel Cohn, Plano, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 135 days.

(21) Appl. No.: 13/546,136

(22) Filed: Jul. 11, 2012

(65) Prior Publication Data

US 2013/0016818 A1 Jan. 17, 2013

Related U.S. Application Data

(60) Provisional application No. 61/506,673, filed on Jul. 12, 2011.

(51) Int. Cl.
*H04M 1/64* (2006.01)
*H04M 3/436* (2006.01)
*H04M 1/65* (2006.01)

(52) U.S. Cl.
CPC ........ *H04M 1/65* (2013.01); *H04M 2203/2011* (2013.01); *H04M 3/436* (2013.01)
USPC ................ 379/88.22; 379/88.23; 379/201.01; 455/414.1

(58) Field of Classification Search
USPC ............. 455/414.1; 379/88.22, 88.23, 201.01
See application file for complete search history.

(56) References Cited

U.S. PATENT DOCUMENTS

| 2004/0266399 A1* | 12/2004 | Simpson .................... 455/412.1 |
| 2005/0105706 A1* | 5/2005 | Kokkinen ................ 379/201.01 |
| 2005/0191969 A1* | 9/2005 | Mousseau ................... 455/90.2 |
| 2007/0003040 A1* | 1/2007 | Radziewicz et al. ..... 379/211.01 |

* cited by examiner

Primary Examiner — Simon King

(57) ABSTRACT

A terminal and a method are described herein for offering termination-side services to a user. In one embodiment, the terminal (e.g., cellular terminal, enterprise or residential wireline device, mobile device) is configured to provide one or more termination-side services (e.g., color ring back tone, voice mail, call diversion, hold before answer) to the user. The terminal is further configured to enable the user to directly setup and manage the one or more termination-side services without interacting with the telecommunication network.

22 Claims, 11 Drawing Sheets

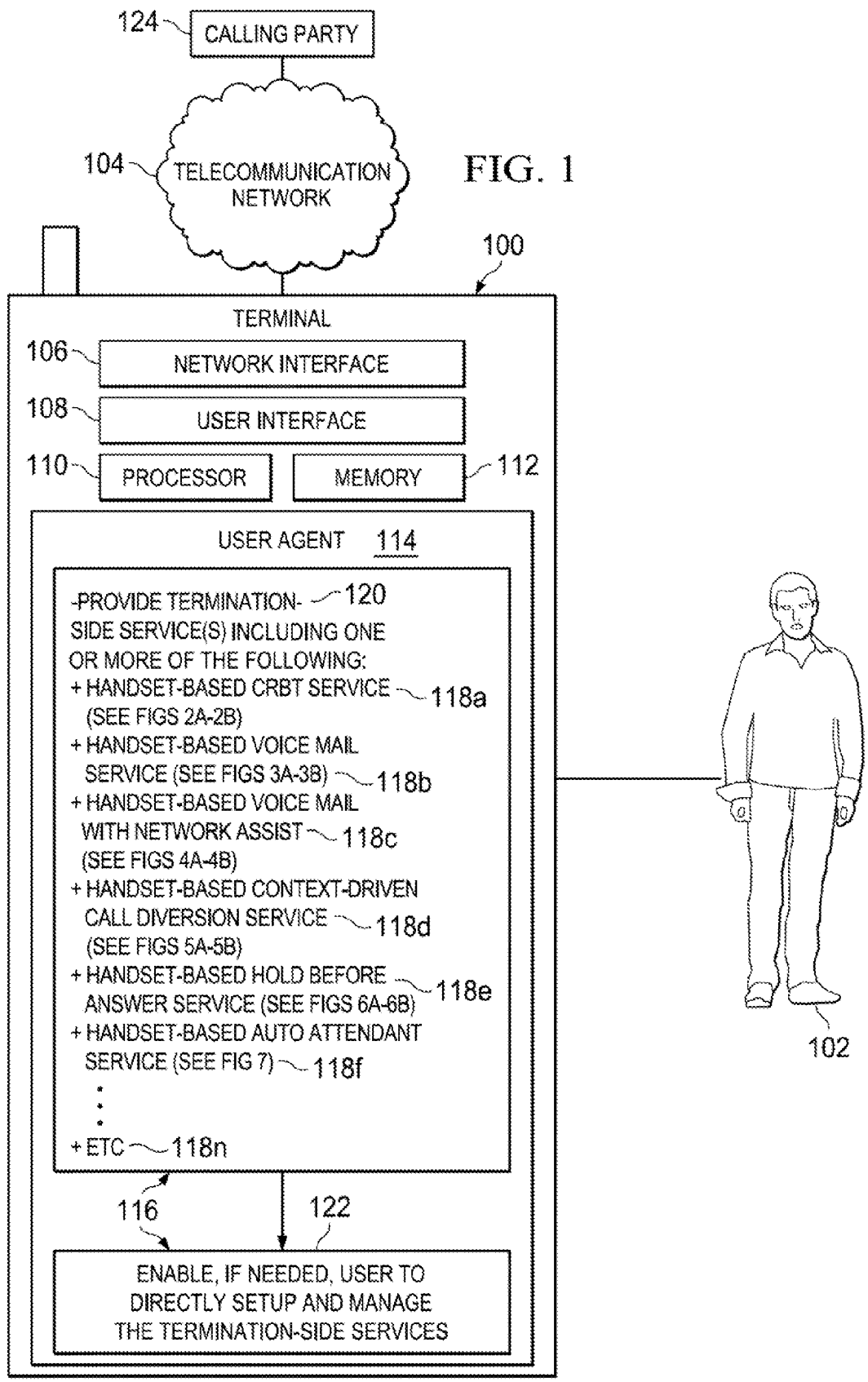

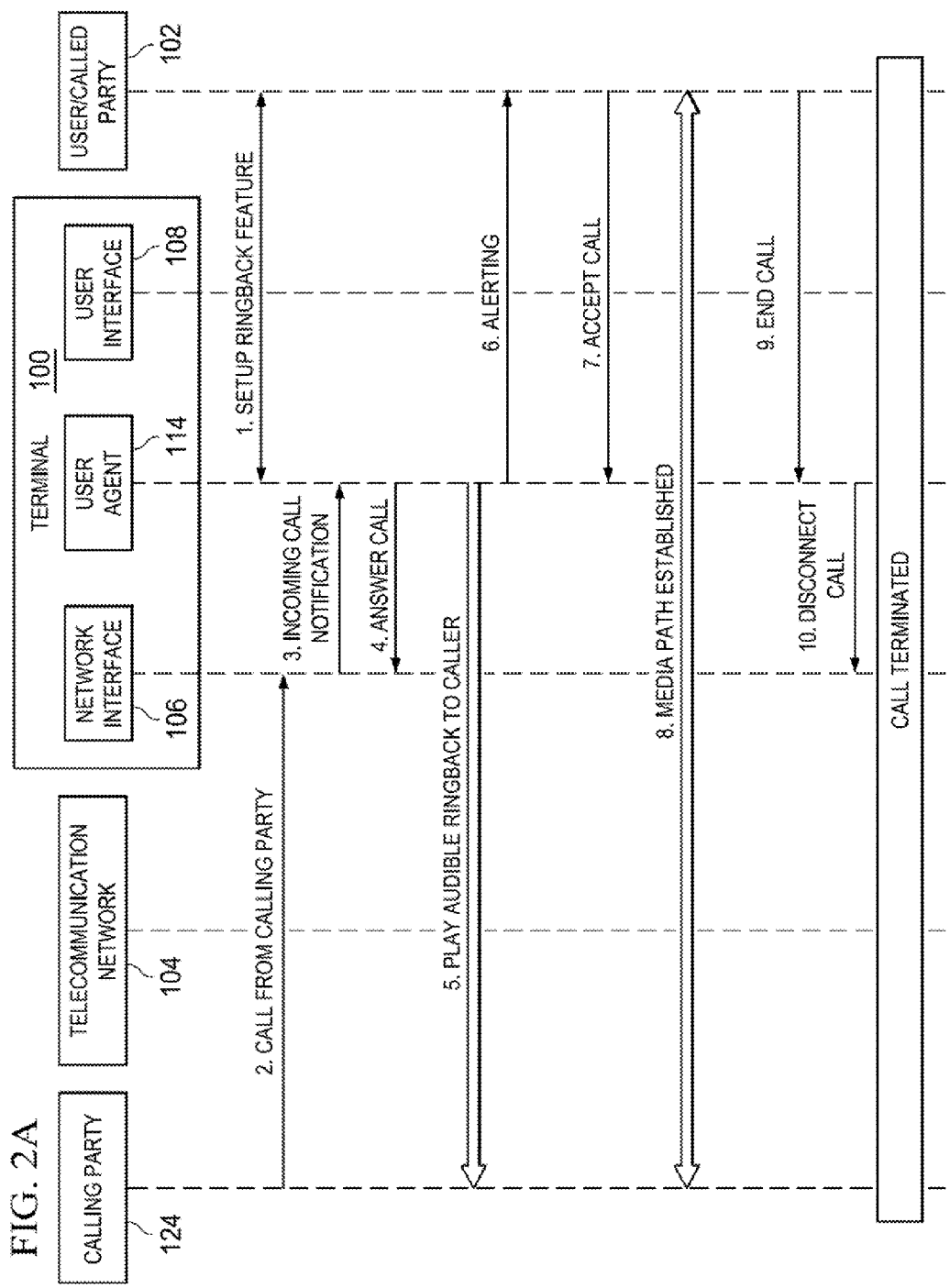

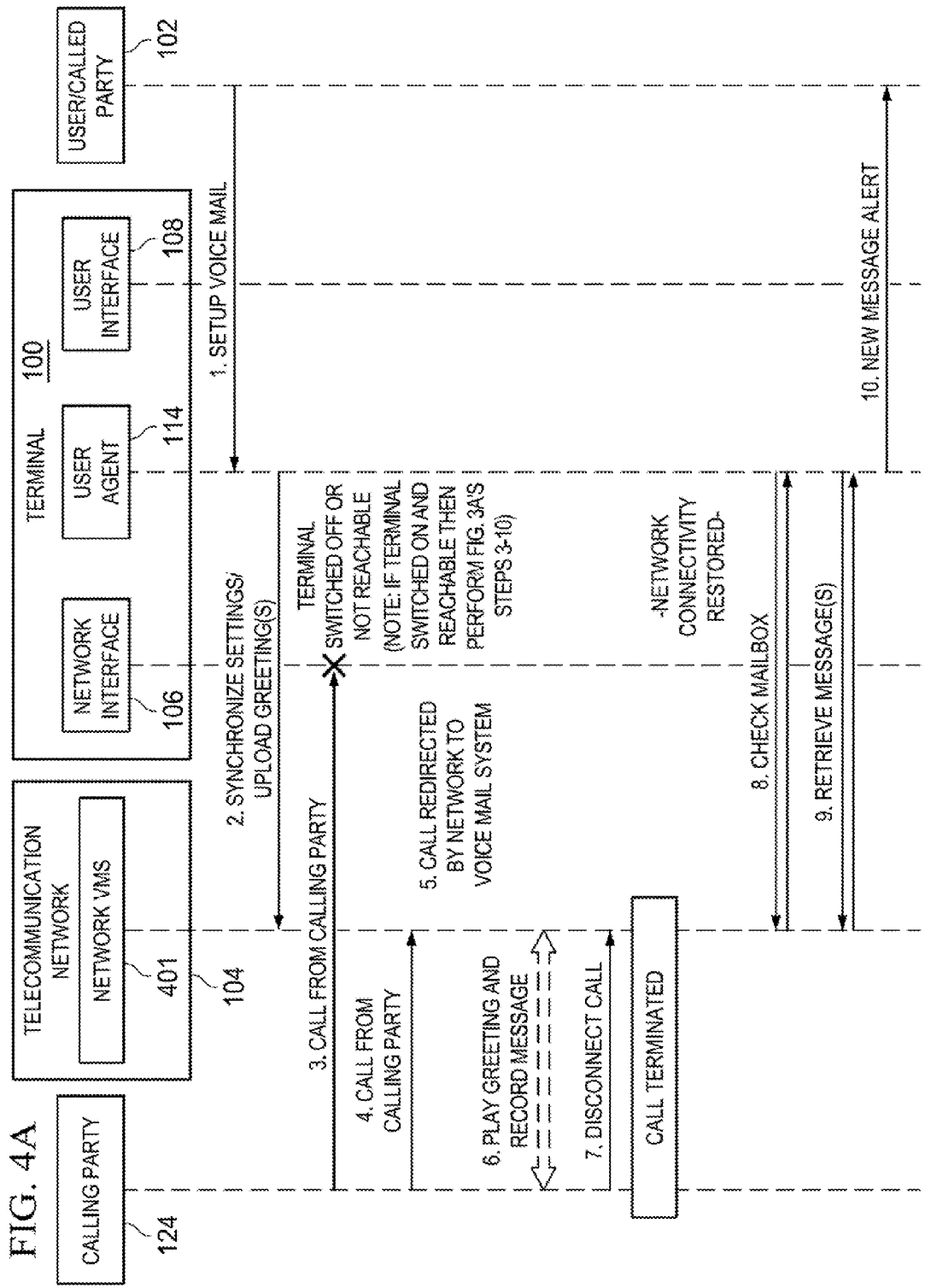

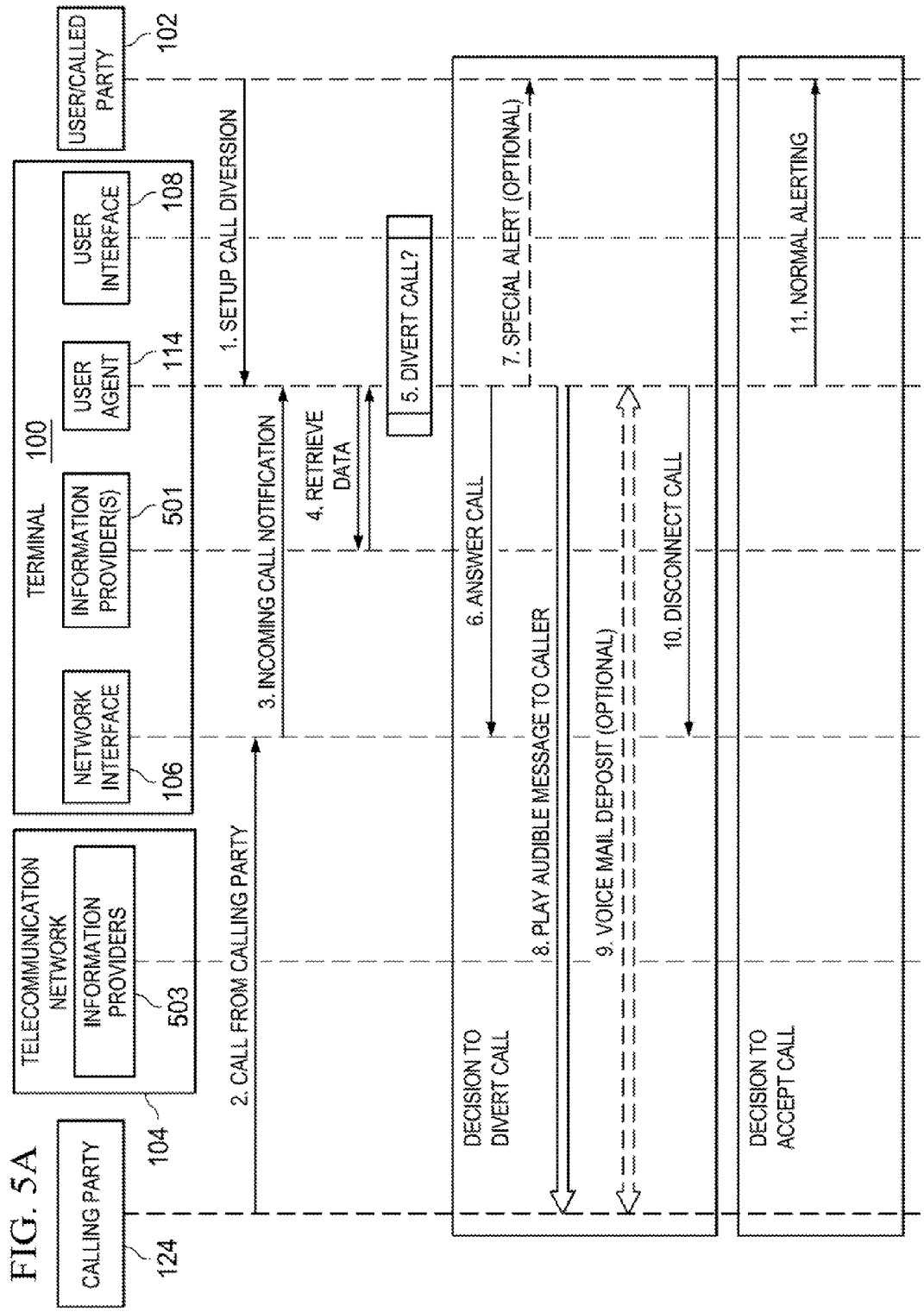

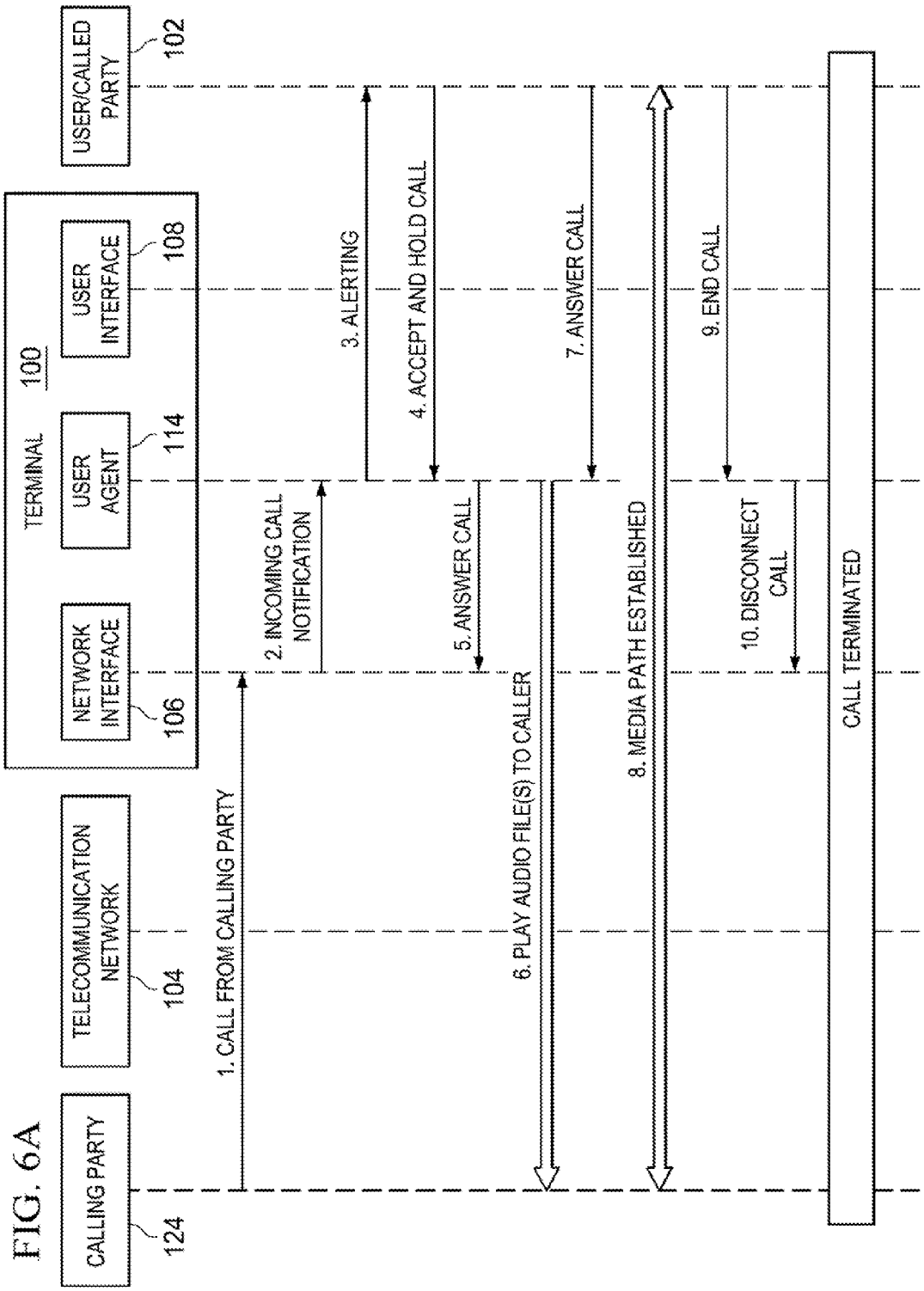

TERMINAL AND METHOD FOR OFFERING TERMINATION-SIDE SERVICES

CLAIM OF PRIORITY

This application claims the benefit of U.S. Provisional Application Ser. No. 61/506,673 filed on Jul. 12, 2011. The contents of this document are hereby incorporated by reference herein.

TECHNICAL FIELD

The present invention relates to a terminal and a method for offering termination-side services to a user. In one embodiment, the terminal (e.g., cellular terminal, enterprise or residential wireline device, mobile device) is configured to provide one or more termination-side services (e.g., color ring back tone, voice mail, call diversion, hold before answer) to the user. The terminal is further configured to enable the user to directly setup and manage the one or more termination-side services without interacting with the telecommunication network.

BACKGROUND

The following abbreviations are herewith defined, at least some of which are referred to within the following description of the prior art and the present invention.
  API Application Programming Interface
  CRBT Color (or Customized or Caller) Ring Back Tone
  HLR Home Location Register
  HSS Home Subscriber Server
  HTTP HyperText Transport Protocol
  HTTPS HTTP Secure
  IMAP Internet Message Access Protocol
  IMS IP Multimedia Subsystem
  IN Intelligent Networking
  IVR Interactive Voice Response
  PRBT Personal(-ized) Ring Back Tone
  RF Radio Frequency
  SMS Short Message Service
  VMS Voice (or Video) Mail System Today's telecommunication networks—both wireline and wireless—offer a variety of different services known as termination-side services to a user (called party). For example, a user might subscribe for a termination-side service known as "color ring back tone" in which the telecommunication network plays a custom ring back tone (often a song clip) to a calling party while the user's phone rings. The user (called party) may have a call forward busy/no answer service in which the telecommunication network routes unanswered or undeliverable calls to a voice mail system. The telecommunication network may also provide an incoming call screening service which bars certain calls from reaching the user (called party) such as anonymous calls or calls from a "black list" of specific telephone numbers.

While the implementations of these termination-side services may differ across technologies and service providers, generally these termination-side services are offered from within the telecommunication network and require coordination across multiple network elements. For example, a termination-side service running in a wireless network—or an IN trigger associated with the service—might be configured on the HLR or HSS and then downloaded to a call server. The call server is configured to handle the call routing and interact with other network elements such as Voice Mail Systems, CRBT/PRBT servers, SCPs, intelligent peripherals, and the like to provide the particular termination-side service.

The existing solutions for termination-side services can be complex to deploy, especially in a multi-vendor environment. Nonetheless, various solutions for termination-side services already exist and their operation is well understood in the telecommunications field. However, the termination-side services which have solutions located within the telecommunication network are largely out of the reach of the end users. For instance, the termination-side services can be difficult to configure or control, by requiring the end user (subscriber) to dial in to an automated voice response system to configure the service, adjust settings, listen to recorded messages, etc. Some termination-side services offer web-based interfaces, but these can be just as cumbersome and they may not be easily accessible from a mobile device.

Another problem with the existing solutions is that the termination-side services are disjointed. For instance, each termination-side service has its own user interface and its own configuration options. So, the end user (subscriber) must learn to use each service separately and cannot coordinate their activities. For example, suppose the end user (subscriber) wants to configure a custom ring back tone and custom voice mail greeting for a given caller. Assuming the telecommunication network allows this level of customization, the end user (subscriber) must separately configure each of these termination-side services. Or suppose, the end user (subscriber) receives a harassing voice mail message and wants to block future calls from the calling party. Listening to the harassing voice mail message and setting up call barring are done in different locations in the telecommunication network.

As a result of being network-based and service operator-controlled, the termination-side services lack flexibility in terms of options and customization by the end user (subscriber). Furthermore, it is impractical for a service provider to offer multiple voice mail solutions from different vendors, for example, because of the cost involved in purchasing, deploying, and maintaining multiple systems that provide the voice mail solutions. Likewise, it is cost-prohibitive for a service operator to install new software upgrades or deploy new features to enhance the termination-side services they already offer to their end users (subscribers). These situations ultimately limit the options available to the end users (subscribers). Accordingly, there has been and is a need to address these problems and other problems to enhance how termination-side services can be provided to an end user (subscriber). These needs and other needs are satisfied by the present invention.

SUMMARY

A terminal and a method that address the aforementioned problems by offering termination-side services to a user are described in the independent claims of the present application. Advantageous embodiments of the terminal and method have been described in the dependent claims of the present application.

In one aspect, the present invention provides a terminal used by a user and configured to interact with a telecommunication network. The terminal comprises at least a network interface, a user interface, a processor, and a memory. The network interface (e.g., telephony API) is configured to interact with the telecommunication network. The user interface (e.g., graphical user interface, screen, touch-pad, speaker, microphone) is configured so the user can interact with the terminal and vice versa. The processor is configured to execute processor-executable instructions stored in a memory to implement a user agent. The user agent is configured to perform the following operations: (1) provide one or more termination-side services to the user; and (2) enable, if needed, the user by utilizing the user interface to directly setup and manage the one or more termination-side services without interacting with the telecommunication network. An advantage of the present invention is that the terminal's user agent provides termination-side services such as personalized ring back and voice messaging that are integrated with the terminal and directly managed by the user without having to interact with the telecommunication network.

In another aspect, the present invention provides a method for offering one or more termination-side services on a terminal used by a user and configured to interact with a telecommunication network. The method implemented by a user agent on the terminal comprising the steps of: (1) providing one or more termination-side services to the user; and (2) enabling, if needed, the user by utilizing a user interface on the terminal to directly setup and manage the one or more termination-side services without interacting with the telecommunication network. An advantage of the present invention is that the terminal's user agent provides termination-side services such as personalized ring back and voice messaging that are integrated with the terminal and directly managed by the user without having to interact with the telecommunication network.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIG. 1 is a diagram illustrating the basic components of a terminal configured in accordance with an embodiment of the present invention;

FIG. 2A is a signal flow diagram illustrating an exemplary way that a handset-based color ring back tone service can be provided to a user in accordance with an embodiment of the present invention;

FIG. 4A is a signal flow diagram illustrating an exemplary way that a handset-based voice mail with network assist service can be provided to a user in accordance with an embodiment of the present invention;

FIG. 5A is a signal flow diagram illustrating an exemplary way that the handset-based context-driven call diversion service can be provided to a user in accordance with an embodiment of the present invention;

FIG. 6A is a signal flow diagram illustrating an exemplary way that the handset-based hold before answer service can be provided to a user in accordance with an embodiment of the present invention;

DETAILED DESCRIPTION

Figure 2B:
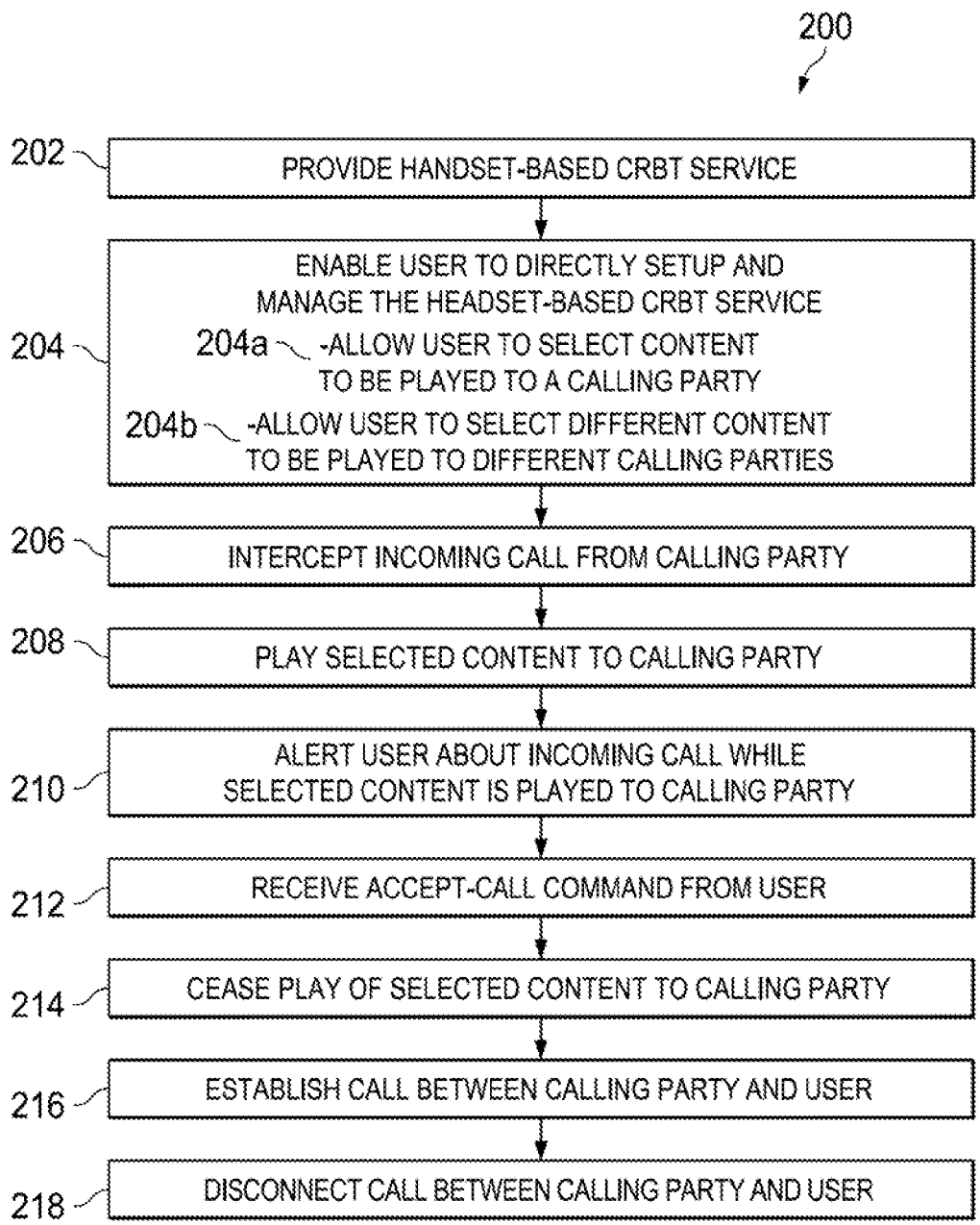
FIG. 2B is a flowchart illustrating an exemplary method which is implemented by the terminal's user agent to provide the handset-based CRBT service to the user in accordance with an embodiment of the present invention.

Referring to FIG. 1, there is a diagram illustrating the basic components of a terminal 100 configured in accordance with an embodiment of the present invention. As shown, the terminal 100 is used by a user 102 and is configured to interact with a telecommunication network 104. The telecommunication network 104 can be a wire line telecommunication network 104, a wireless telecommunication network 104, or a combination thereof. The terminal 100 may be a cellular terminal 100 (e.g., a 2G/3G mobile smartphone 100), an enterprise or residential wireline device 100 (e.g. an IMS phone 100), or a mobile IMS terminal 100 (e.g. VoIP client on a 3G/4G mobile device 100).

The terminal 100 includes at least a network interface 106, a user interface 108, a processor 110, and a memory 112. The network interface 106 (e.g., telephony API 106) is configured to interact with the telecommunication network 104. The user interface 108 (e.g., graphical user interface, screen, touchpad, speaker, microphone) is configured so the user 102 (also referred to herein as called party 102 and subscriber 102) can interact with the terminal 100 and vice versa. The processor 110 is configured to interact with the memory 112 which stores processor-executable instructions and to execute the stored processor-executable instructions to implement a user agent 114 that provides one or more termination-side services 118a, 118b, 118c, 118d, 118e, 118f . . . 118n. The terminal 100 includes many other well known components but for clarity only the components which are needed to explain and enable the present invention have been described in detail herein.

The user agent 114 is a unique combination of hardware-software that performs a method 116 which includes the following steps-operations: (1) provide one or more termination-side services 118a, 118b, 118c, 118d, 118e, 118f . . . 118n to the user 102 (step 120); and (2) enable, if needed, the user 102 by utilizing the user interface 108 to directly setup and manage the one or more provided termination-side services 118a, 118b, 118c, 118d, 118e, 118f . . . 118n without interacting with the telecommunication network 104 (step 122). As described in greater detail below, the user agent 114 may provide and enable the user 104 to directly setup and manage one or more of the following exemplary termination-side services 118*a*, 118*b*, 118*c*, 118*d*, 118*e*, 118*f*... 118*n*:

I. Handset-based color ring back tone service 118*a* (see FIGS. 2A-2B).

II. Handset-based voice mail service 118*b* (see FIGS. 3A-3B).

III. Handset-based voice mail with network assist service 118*c* (see FIGS. 4A-4B).

IV. Handset-based context-driven call diversion service 118*d* (see FIGS. 5A-5B).

V. Handset-based hold before answer service 118*e* (see FIGS. 6A-6B).

VI. Handset-based auto attendant service 118*f* (see FIG. 7).

I. Handset-Based Color Ring Back Tone Service 118*a* (See FIGS. 2A-2B)

One handset-resident termination-side service is Color Ring Back Tone (CRBT). Unlike the traditional CRBT service, which is provided by the telecommunication network 104, this service generates customizable ring back tones from the end user terminal 100. The user 102 might select a particular song, recorded message, or video clip to play to a calling party 124 (originating party 124) while they wait for the user 102 to answer the call. In this case, the terminal 100 itself plays the selected ring back tone without requiring any intervention by the telecommunication network 104. The handset-based color ring back tone service 118*a* is accomplished by answering the call as soon as it comes in and proceeding to alert the user while playing the CRBT. An exemplary scenario for providing the handset-based color ring back tone service 118*a* to the user 102 is described below with respect to FIGS. 2A-2B.

Referring to FIG. 2A, there is a signal flow diagram illustrating an exemplary way that the handset-based color ring back tone service 118*a* can be provided to the user 102 in accordance with an embodiment of the present invention. In this example, the handset-based color ring back tone service 118*a* can be provided to the user 102 in accordance with the following steps:

1. The user 102 utilizes the user interface 108 to interact with the user agent 114 to enable, setup, and manage the handset-based CRBT service 118*a* on the terminal 100. This interaction involves selecting an audio and/or video sample to play to incoming calling parties 124 (one shown). The user might enable the handset-based CRBT service 118*a* only for a certain contact (calling party 124) or groups of contacts (calling parties 124) or might assign a different audio/video selection for each contact (calling party 124) or group of contacts (calling parties 124).

2. At some time later, the network interface 106 receives a call from a calling party 124.

3. The incoming call triggers the network interface 106 to notify the user agent 114. This notification would typically contain information (e.g., calling party's phone number) about the calling party 124.

4. Upon receiving the notification, the user agent 114 instructs the network interface 106 to answer the call. Unlike a typical call, however, the call is not connected to the terminal's user interface 108 (e.g., headset or speaker/microphone). Instead the media paths are configured such that the user agent 114 controls the incoming and outgoing audio (and video, if applicable).

5. The user agent 114 begins playing an audio or video selection (or selections) to the calling party 124.

6. The user agent 114 while playing the audio/video selection to the calling party 124 also interacts with the user interface 108 to alert the user 102 about the incoming call. This step includes using any visual and/or audible and/or tactile methods for getting the attention of the user 102.

7. Eventually the user 102 interacts with the user interface 108 to accept the call.

8. The user agent 114 ceases the audio/video play out to the calling party 124 and reroutes the incoming/outgoing media streams to the user 102 (e.g. via the handset microphone and earpiece) so the user 102 can communicate with the calling party 124. If desired, the user agent 114 may remain in the media path to provide an additional service such as call recording.

9. At some time later, one of the parties 102 or 124 chooses to end the call. In this example, the user 102 decides to terminate the call. This is indicated to the user agent 114, which in turn disconnects the call between the user 102 and the calling party 124.

10. Call is terminated.

Referring to FIG. 2B, there is a flowchart illustrating an exemplary method 200 implemented by the terminal's user agent 114 to provide the handset-based CRBT service 118*a* to the user 102 in accordance with an embodiment of the present invention. At step 202, the terminal's user agent 114 provides the handset-based CRBT service 118*a* to the user 102. At step 204, the terminal's user agent 114 enables the user 102 by utilizing the user interface 108 to directly setup and manage the handset-based CRBT service 118*a* without interacting with the telecommunication network 104 (FIG. 2A's step 1). For instance, the terminal's user agent 114 enables the user 102 to directly setup and manage the handset-based CRBT service 118*a* by allowing the user 102 to select content to be played to a calling party 124 if an incoming call is received from the calling party 124 (step 204*a*). If desired, the user 102 can select different content to be played if and when incoming calls are received from different calling parties 124 (step 204*b*). After the enabling step 204, the terminal's user agent 114 at step 206 will at some point in time intercept the incoming call from the calling party 124 (see FIG. 2A's step 3). At step 208, the terminal's user agent 114 plays the selected content to the calling party 124 without requiring any intervention by the telecommunication network (see FIG. 2A's steps 4-5). At step 210, the terminal's user agent 114 alerts the user 102 via the user interface 108 about the incoming call while the selected content is being played to the calling party 124 (see FIG. 2A's step 6). At step 212, the terminal's user agent 114 receives an accept-call command from the user 102 via the user interface 108 (see FIG. 2A's step 7). At step 214, the terminal's user agent 114 ceases the play of the selected content to the calling party 124 (see FIG. 2A's step 8). At step 216, the terminal's user agent 114 establishes the call between the calling party 124 and the user 102 (see FIG. 2A's step 8). At step 218, the terminal's user agent 114 when one of the parties 102 or 124 chooses to end the call will then disconnects the call between the calling party 124 and the user 102 (see FIG. 2A's steps 9-10).

II. Handset-Based Voice Mail Service 118*b* (See FIGS. 3A-3B)

Another handset-based service is voice mail recording with an audible screening option. This is similar to the existing voice mail functionality provided by wireline answering machines. The calling party leaves a message, during which time a message is recorded directly on the answering machine and also played through an external speaker. At any time while the message is being left, the user may pick up the call. The difference between such a service provided by using an answering machine and the present invention is that the handset-based voice mail service 118*b* may be offered on the terminal 100 (e.g., mobile phone 100) as opposed to a fixed answering machine. Additionally, the handset-based voice mail service 118b is implemented solely in the terminal 100 and does not require dedicated hardware. It should be appreciated that "voice mail" in the present invention could also refer to video mail. Hence, when receiving a video call, the terminal 100 might play an audio/visual voice mail greeting and then record a video mail message for the user 102. An exemplary scenario for providing the handset-based voice mail service 118b to the user 102 is described below with respect to FIGS. 3A-3B.

Figure 3A:
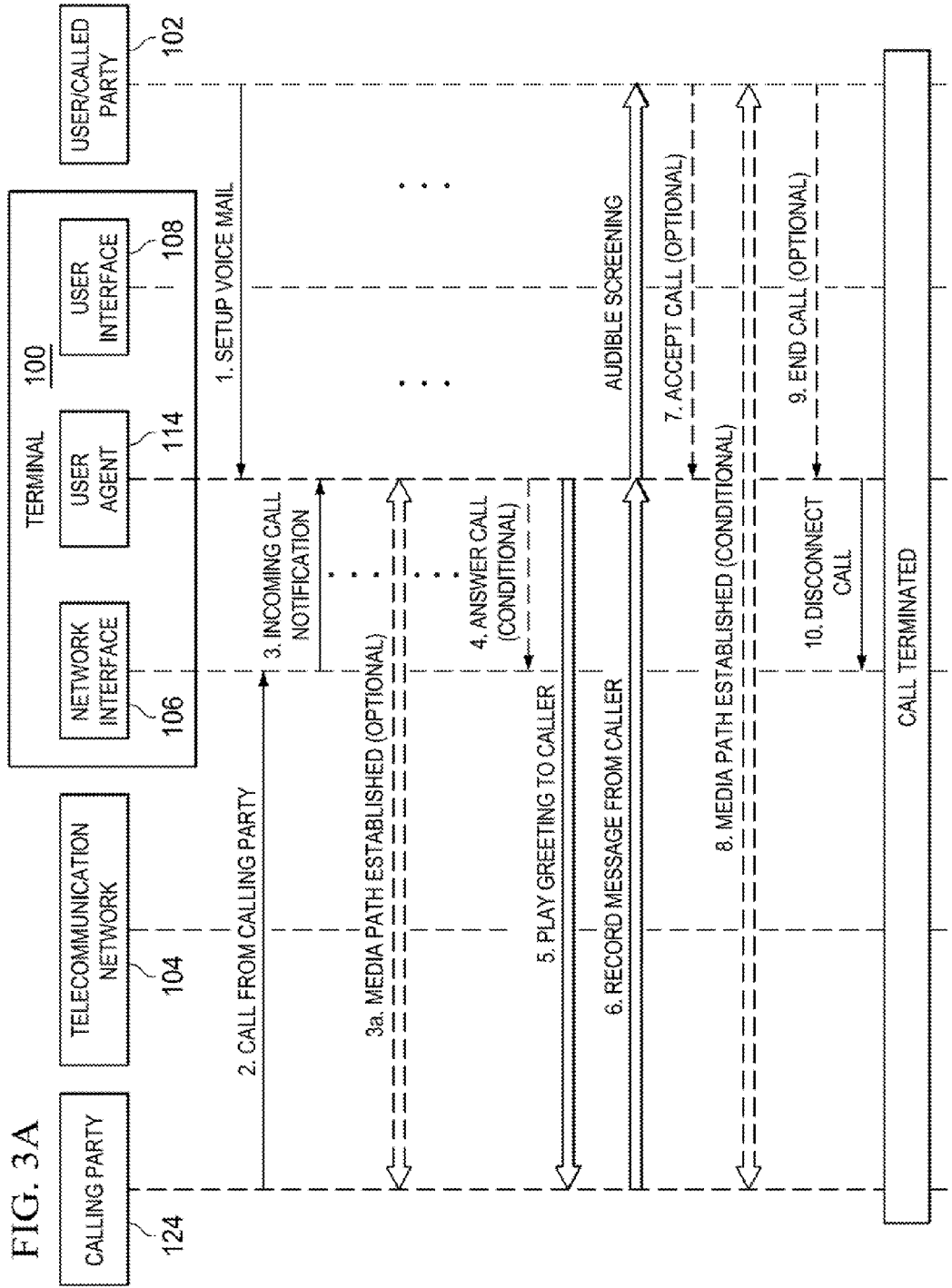
FIG. 3A is a signal flow diagram illustrating an exemplary way that a handset-based voice mail service can be provided to a user in accordance with an embodiment of the present invention.

Referring to FIG. 3A, there is a signal flow diagram illustrating an exemplary way that the handset-based voice mail service 118b can be provided to the user 102 in accordance with an embodiment of the present invention. In this example, the handset-based voice mail service 118b can be provided to the user 102 in accordance with the following steps:

1. The user 102 utilizes the user interface 108 to interact with the user agent 114 to enable the handset-based voice mail service 118b, assuming the handset-based voice mail service 118b is not enabled by default. The user 102 might also record a default greeting on the terminal 100 to be played to an incoming calling party 124 or select a prerecorded greeting from a list to be played to the incoming calling party 124. The user 102 might also set other parameters such as the length of time the terminal 100 should ring before the calling party 124 receives the greeting or if desired an option to continue ringing while the voice mail greeting is played to the calling party 124.
2. At some time later, the network interface 106 receives a call from a calling party 124.
3. The incoming call triggers the network interface 106 to notify the user agent 114. At this point, there may be other services being utilized (not shown) before the call goes to voice mail. This may include the user agent 114 answering the call and interacting with the calling party 124 (step 3a).
4. Assuming the call was not previously answered (either by the end user 102 or the user agent 114), the user agent 114 now answers the call. This prevents the telecommunication network 104 from directing the calling party 124 to the network-based voice mail system, if one exists.
5. The user agent 114 plays a recorded greeting (audio or video) or perhaps a text-to-speech greeting to the calling party 124.
6. The user agent 114 begins recording the incoming audio or video message from the calling party 124. At the same time, the user agent 114 allows the user 102 to hear the caller's message as it is recorded. For video calls, the user 102 might also see the calling party 124. The user agent 114 may play the caller's message as it is being recorded through the phone's earpiece or speaker or an external audio device (e.g. headset).
7. The user 102 may or may not choose to accept the call upon hearing the caller's message.
8. Assuming the user 102 picks-up the call, the user agent 114 would then cease the recording of the voice message and connect the audio stream (and video stream, if applicable) from the calling party 124 to the user 102. At this point, the call would be in the same state as any other answered call.
9. At some time later, one of the parties 102 or 124 chooses to end the call. In this example, the user 102 decides to terminate the call. This is indicated to the user agent 114, which in turn disconnects the call between the user 102 and the calling party 124.
10. Call is terminated.

Figure 3B:
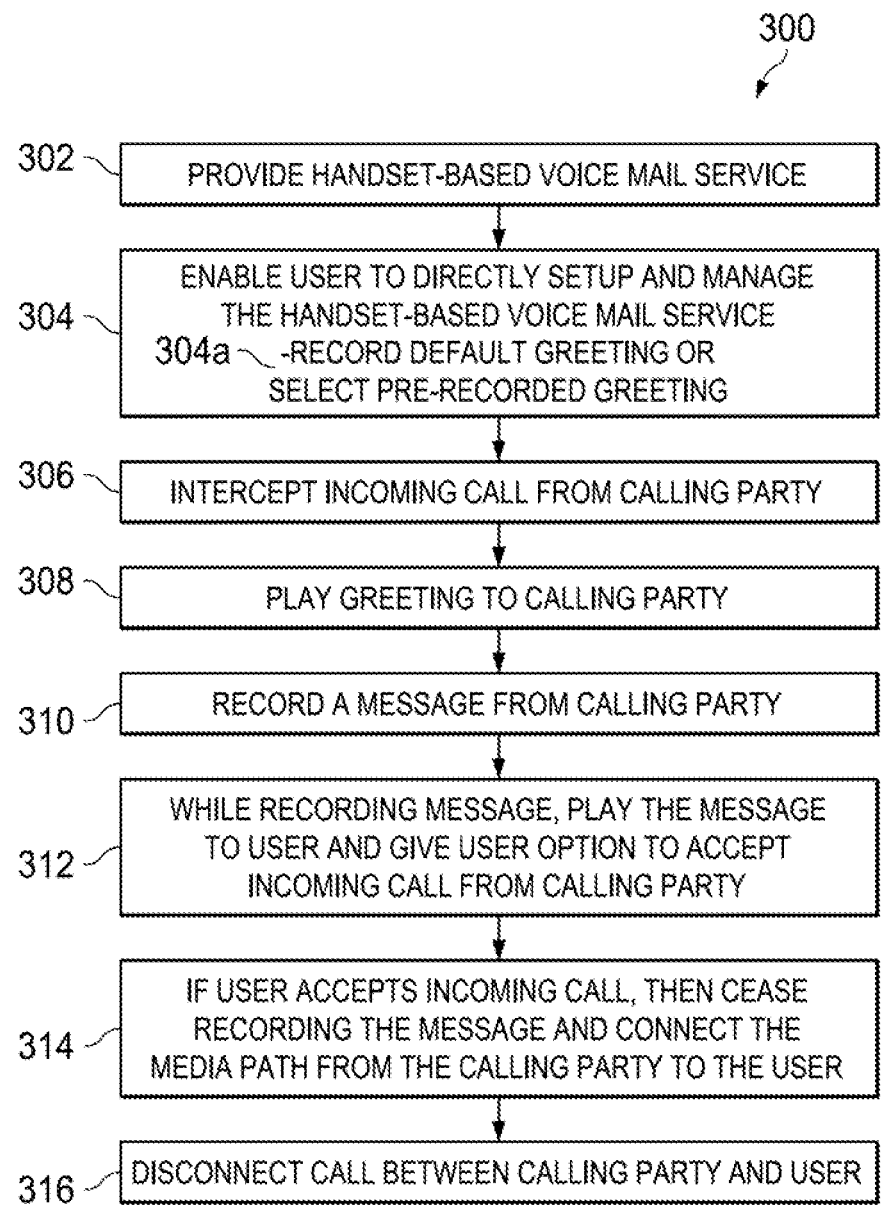
FIG. 3B is a flowchart illustrating an exemplary method which is implemented by the terminal's user agent to provide the handset-based voice mail service to the user in accordance with an embodiment of the present invention.

Referring to FIG. 3B, there is a flowchart illustrating an exemplary method 300 implemented by the terminal's user agent 114 to provide the handset-based voice mail service 118b to the user 102 in accordance with an embodiment of the present invention. At step 302, the terminal's user agent 114 provides the handset-based voice mail service 118b to the user 102. At step 304, the terminal's user agent 114 enables the user 102 by utilizing the user interface 108 to directly setup and manage the handset-based voice mail service 118b without interacting with the telecommunication network 104 (FIG. 3A's step 1). For instance, the terminal's user agent 114 enables the user 102 to directly setup and manage the handset-based voice mail service 118b by allowing the user 102 to record a default greeting or select a pre-recorded greeting from a list to be played to a calling party 124 if an incoming call is received from the calling party 124 (step 304a). After the enabling step 304 and if the network interface 106 is able to interact with the telecommunication network 104, the terminal's user agent 114 at step 306 will at some point in time intercept an incoming call from the calling party 124 (see FIG. 3A's step 3). At step 308, the terminal's user agent 114 plays the greeting to the calling party 124 (see FIG. 3A's step 5). At step 310, the terminal's user agent 114 records a message from the calling party 124 (see FIG. 3A's step 6). At step 312, the terminal's user aunt 114 while recording the message also plays the message to the user 102 and gives the user 102 an option to accept the incoming call from the calling party 112 (see FIG. 3A's step 6). At step 314, the terminal's user agent 114 in the event the user 102 accepts the incoming call would cease the recording of the voice message and connect the audio stream (and video stream, if applicable) from the calling party 124 to the user 102 (see FIG. 3A's steps 7-8). At step 316, the terminal's user agent 114 when one of the parties 102 or 124 chooses to end the call will disconnect the call between the calling party 124 and the user 102 (see FIG. 3A's steps 9-10).

III. Handset-Based Voice Mail with Network Assist Service 118c (See FIGS. 4A-4B)

One possible drawback of using the terminal 102 to provide the handset-based voice mail service 118b is that the terminal 102 may not always be accessible or connected to the telecommunication network 104 to receive the incoming calls from calling parties 102. For example, the terminal 102 may be switched off or in "airplane mode" so as not to be available to the telecommunication network 104. Or, the terminal 100 may also be unavailable to the telecommunication network 104 because of a lack of adequate RF coverage at the time when an incoming call is made by the calling party 124. This drawback may be solved by providing the handset-based voice mail with network assist service 118c. In this solution, the terminal's user agent 114 works with a network-based voice mail system 401 to provide uninterrupted voice mail service to the user 102. The network-based VMS 401 handles calls that are not answered by the terminal 100 and then forwards the record message to the terminal 100 once it becomes available to the telecommunication network 104. The terminal's user agent 114 enables the enhanced voice mail service 118c by providing the necessary instructions along with the recorded greeting or selected greeting to the networked-based VMS 401. An advantage of this scenario is that the user 102 is able to configure the enhanced voice mail service 118c by interacting only with the terminal 100 and not having to interact with the network-based VMS 401. Plus, any message that is deposited on the network-based VMS 401 is later retrieved by the terminal's user agent 114 so that the user 102 can access all of their messages in the same place regardless of whether the message is left directly on the terminal 100 or if the message is left on the network-based VMS 401. An exemplary scenario for providing the handset-based voice mail with network assist service 118c to the user 102 is described below with respect to FIGS. 4A-4B.

Referring to FIG. 4A, there is a signal flow diagram illustrating an exemplary way that the handset-based voice mail with network assist service 118c can be provided to the user 102 in accordance with an embodiment of the present invention. In this example, the handset-based voice mail with network assist service 118c can be provided to the user 102 in accordance with the following steps:

1. The user 102 utilizes the user interface 108 to interact with the user agent 114 to enable the handset-based voice mail with network assist service 118c. If the handset-based voice mail with network assist service 118c is not enabled by default. The user 102 might also record a default greeting on the terminal 100 to be played to an incoming calling party 124 or select a prerecorded greeting from a list to be played to the incoming calling party 124. The user 102 might also set other parameters such as the length of time the terminal 100 should ring before the calling party 124 is played the greeting or if desired an option to continue ringing while the voice mail greeting is played to the calling party 124.
2. The user agent 114 communicates with the network-based VMS 401 to synchronize any relevant user settings and to upload (if applicable) the newly-recorded greeting. As an example, this communication may be performed over an IP network using HTTP or HTTPS. Once this step is completed, the network-based VMS 401 is able to receive calls and process them in a similar fashion to the terminal 102 except for the capability of playing the message to the user 102 while recording the message from the calling party 124.
3. At some time later, a call is placed from the calling party 124 to the user 102.
4. In this example, the terminal 100 cannot be reached. This may be due to the terminal 100 being located outside network coverage, switched off, or in "airplane mode" (wireless connection disabled).
5. The telecommunication network 104 redirects the incoming call to the network-based VMS 401. Note: if the terminal 100 was switched-on and reachable then the voice mail service would proceed as per FIG. 3A's steps 3-10.
6. The network-based VMS 401 answers the call, plays the appropriate voice or video greeting to the calling party 124, and allows the calling party 124 to record a message. The recorded message is stored on the network-based VMS 401.
7. Having left a message, the calling party 124 disconnects from the network-based VMS 401.
8. Some time later, once the terminal 100 has re-established its connection with the telecommunication network 104, the user agent 114 communicates with the network-based VMS 401 to check if any messages have been left. For instance, the user agent 114 can check and retrieve messages from the network-based VMS 401 utilizing protocols such as IMAP or Visual Voice Mail (combination of IMAP and SMS).
9. Assuming there is at least one new message present on the network-based VMS 401, the user agent 114 retrieves (downloads) the message or messages and stores them locally on the terminal 100. Once the messages are downloaded, the user agent 114 may optionally delete the message(s) from the network-based VMS 401. Alternatively, the user agent 114 may leave the message(s) on the network-based VMS 401 so they can serve as a backup until the user 102 deletes the message(s) on the terminal 100.
10. The user agent 114 then informs the user 102 via the user interface 108 that new message(s) are available.

Figure 4B:
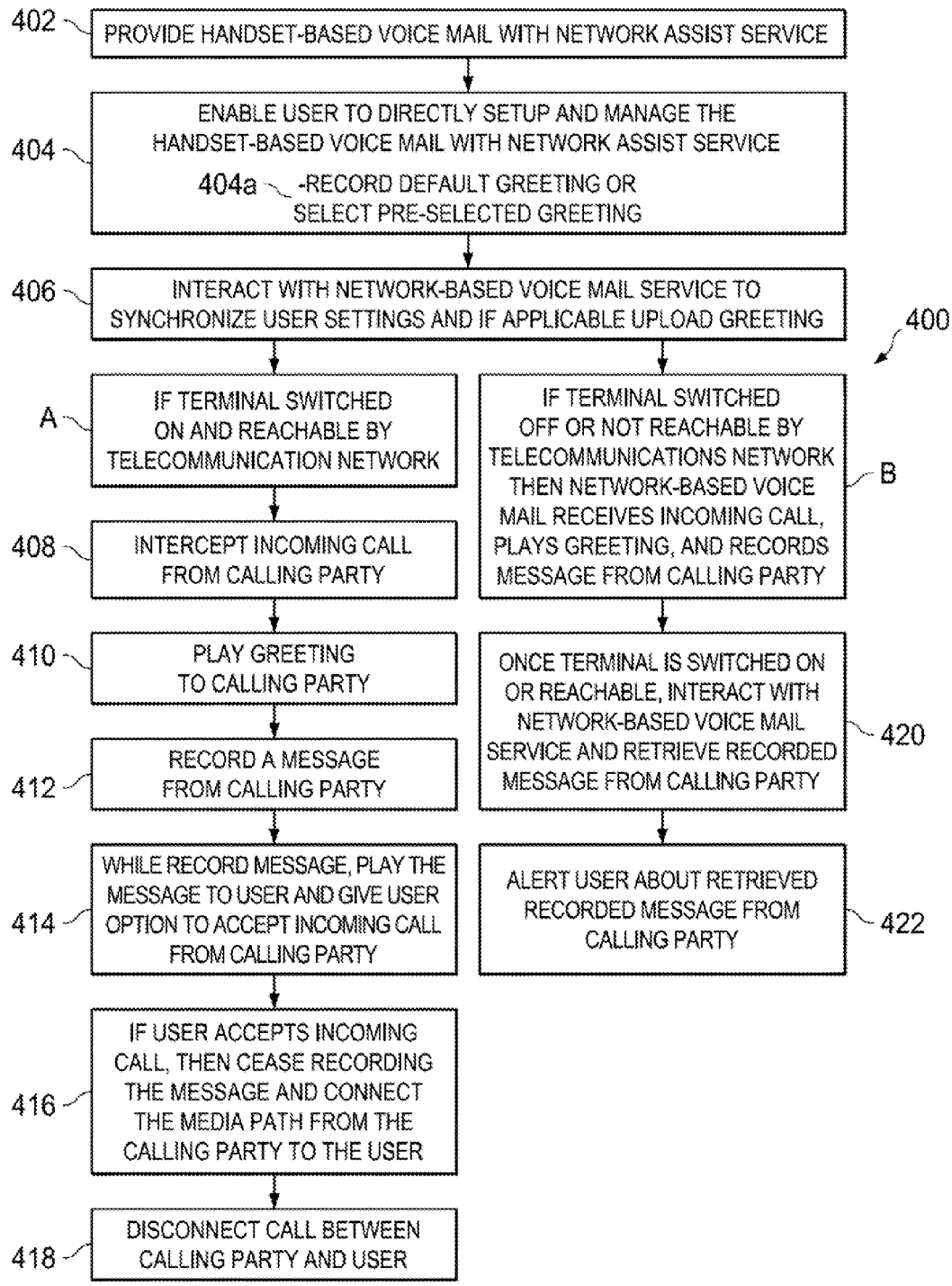
FIG. 4B is a flowchart illustrating an exemplary method which is implemented by the terminal's user agent to provide the handset-based voice mail with network assist service to the user in accordance with an embodiment of the present invention.

Referring to FIG. 4B, there is a flowchart illustrating an exemplary method 400 implemented by the terminal's user agent 114 to provide the handset-based voice mail with network assist service 118c to the user 102 in accordance with an embodiment of the present invention. At step 402, the terminal's user agent 114 provides the handset-based voice mail with network assist service 118c to the user 102. At step 404, the terminal's user agent 114 enables the user 102 by utilizing the user interface 108 to directly setup and manage the handset-based voice mail with network assist service 118c without interacting with the telecommunication network 104 (FIG. 4A's step 1). For instance, the terminal's user agent 114 enables the user 102 to directly setup and manage the handset-based voice mail with network assist service 118c by allowing the user 102 record a default greeting or select a pre-recorded greeting from a list to be played to a calling party 124 if an incoming call is received from the calling party 124 (see step 404a). At step 406, the terminal's user agent 114 interacts with the network-based VMS 401 to synchronize user settings and if applicable upload the particular greeting to be played to the calling party 124 in case the terminal's network interface 106 is not able to receive the incoming call from the calling party 124.

After the enabling step 404, the interacting step 406, and if the terminal's network interface 106 is able to interact with the telecommunication network 104 (see box "A"), then the terminal's user agent 114 performs steps 408, 410, 412, 414, 416 and 418 as described next. At step 408, the terminal's user agent 114 will at some point in time intercept an incoming call from the calling party 124 (see FIG. 3A's step 3). At step 410, the terminal's user agent 114 plays the greeting to the calling party 124 (see FIG. 3A's step 5). At step 412, the terminal's user agent 114 records a message from the calling party 124 (see FIG. 3A's step 6). At step 414, the terminal's user agent 114 while recording the message also plays the message to the user 102 and gives the user 102 an option to accept the incoming call from the calling party 112 (see FIG. 3A's step 6). At step 416, the terminal's user agent 114 in the event the user 102 accepts the incoming call would cease the recording of the voice message and connect the audio stream (and video stream, if applicable) from the calling party 124 to the user 102 (see FIG. 3A's steps 7-8). At step 418, the terminal's user agent 114 when one of the parties 102 or 124 chooses to end the call will disconnect the call between the calling party 124 and the user 102 (see FIG. 3A's steps 9-10).

After the enabling step 404, the interacting step 406, and if the terminal's network interface 106 is not able to interact with the telecommunication network 104 (see box "B"), then the telecommunication network 104 redirects the incoming call from the calling party 124 to the network-based VMS 401 which plays the greeting to the calling party 124 and records the message from the calling party 124. Once, the terminal's network interface 106 is able to interact with the telecommunication network 104 then the terminal's user agent 114 performs steps 420 and 422 as described next. At step 420, the terminal's user agent 114 interacts with the network-based VMS 401 and retrieves the recorded message (if any) associated with the calling party 124 (see FIG. 4A's step 8-9). The retrieved messages are stored on the terminal 100. Once the messages are downloaded from the network-based VMS 401, the terminal's user agent 114 may optionally delete the message(s) from the network-based VMS 401. Alternatively, the terminal's user agent 114 may leave the message(s) on the network-based VMS 401 so they can serve as a backup until the user 102 deletes the message(s) on the terminal 100 At step 422, the terminal's user agent 114 alerts the user about the retrieved recorded message (see FIG. 4A's step 10).

IV. Handset-Based Context-Driven Call Diversion Service 118d (See FIGS. 5A-5B)

Another handset-based service is call diversion or barring based on the "context" of the user 102 (called party 102). The "context" refers to the user's status as determined by the user agent 114 without interacting with the user 102. For example, the user 102 may previously indicate that they do not wish to receive calls while they are in meetings or otherwise busy. The user agent 114 at the time of the incoming call can check the user's electronic calendar(s) to determine if the user 102 is attending a meeting or is otherwise busy. The electronic calendar(s) may be a calendar kept on the terminal 100 and/or a calendar which is accessible online (e.g., Internet) or via a network connection of some sort to the user agent 114. In this example, when the user 102 is busy (as indicated on the electronic calendar), the calling party 124 is sent by the user agent 114 directly to voice mail or played a special message indicating that the user 102 (called party 102) is busy. The message might even specify when the user 102 (called party 102) will become free based on the information retrieved from the electronic calendar. In other examples, the user agent 114 might rely on various techniques for determining the user's context (or status) such as, for example, using the time of day, the terminal's current GPS location, the terminal's velocity, the ambient noise around the terminal 102. In any case, the user agent 114 implements the same process which is: (1) determine the user's status; (2) based on the status accept the incoming call normally or provide a special treatment. An exemplary scenario for providing the handset-based context-driven call diversion service 118d to the user 102 is described below with respect to FIGS. 5A-5B.

Referring to FIG. 5A, there is a signal flow diagram illustrating an exemplary way that the handset-based context-driven call diversion service 118d can be provided to the user 102 in accordance with an embodiment of the present invention. In this example, the handset-based context-driven call diversion service 118d can be provided to the user 102 in accordance with the following steps:

1. The user 102 utilizes the user interface 108 to interact with the user agent 114 to enable the handset-based context-driven call diversion service 118d. This may involve one or more steps including: enabling the feature, selecting or inputting the criteria for call diversion, applying the call diversion criteria to specific contacts or groups of contacts, and setting other parameters related to the feature's operation.
2. At some time later, the network interface 106 receives a call from a calling party 124.
3. The incoming call triggers the network interface 106 to notify the user agent 114. This notification would typically contain information (e.g., calling party's phone number) about the calling party 124.
4. The user agent 114 interacts with one or more services or information providers 501 (e.g., the electronic calendar, GPS unit) on the user device. The purpose of this step is to gather data that will be used to determine if the incoming call should be accepted or diverted based on the criteria established in step 1.
5. Based on the call diversion criteria and the current "context" as determined by the information collected in step 4, the user agent 114 decides whether to accept or divert the incoming call.
6. If the incoming call is to be diverted, the user agent 114 answers the call on behalf of user 102. The user agent 114 does not alert (e.g. ringing the terminal 100) the user 102 about the incoming call.
7. Optionally or based on user preference, the user agent 114 may present an alert to the user 102 informing him/her that an incoming call from the calling party 124 has been diverted.
8. The user agent 114 plays a message to the calling party 124. This message may be the normal voice mail greeting or a special message related to call diversion that may indicate why the call is not being accepted. The message could also be a video clip in the case of a video call.
9. Optionally or based on user preference, the user agent 114 may receive a voice mail from the calling party 124.
10. Finally, the call is terminated.
11. If the incoming call was accepted by the logic applied in step 5, then the user agent 114 executes the normal, or usual, process for handling the incoming call. This process typically includes where the user agent 114 uses some form or method to alert the user 102 about the incoming call from the calling party 124.

Figure 5B:
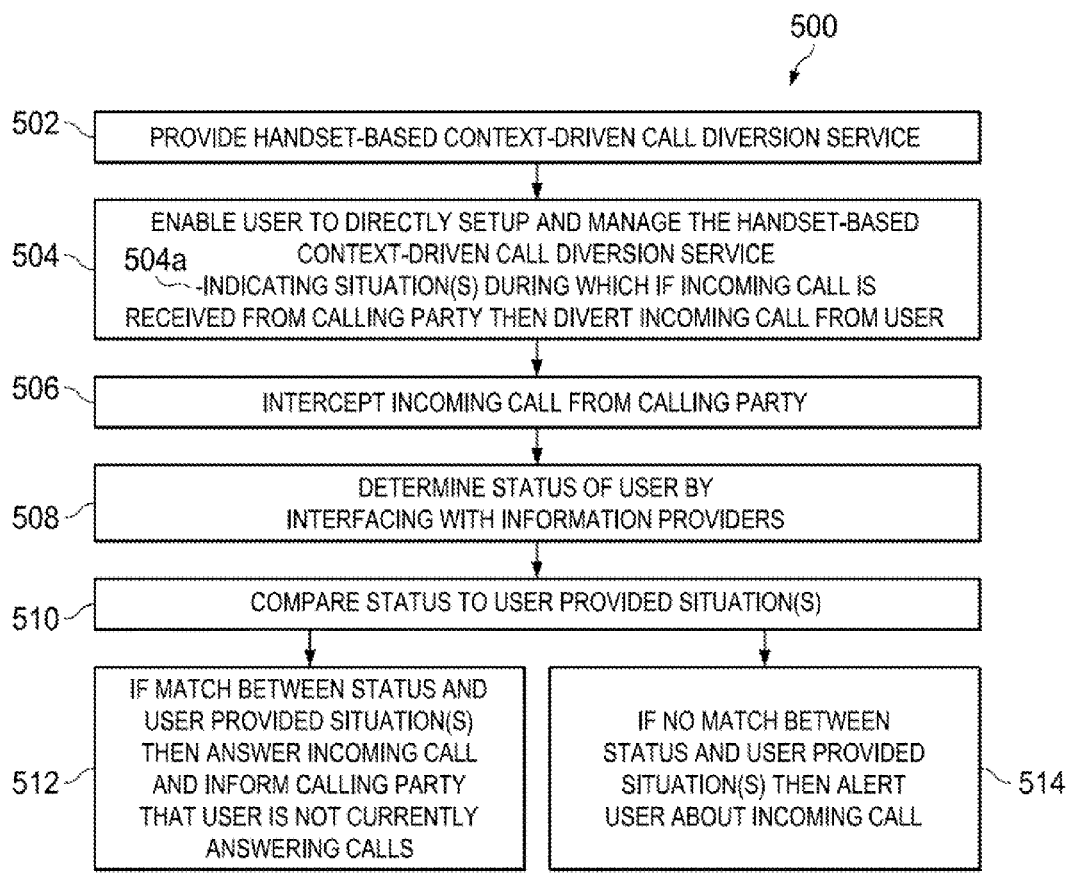
FIG. 5B is a flowchart illustrating an exemplary method which is implemented by the terminal's user agent to provide the handset-based context-driven call diversion service to the user in accordance with an embodiment of the present invention.

Referring to FIG. 5B, there is a flowchart illustrating an exemplary method 500 implemented by the terminal's user agent 114 to provide the handset-based context-driven call diversion service 118d to the user 102 in accordance with an embodiment of the present invention. At step 502, the terminal's user agent 114 provides the handset-based context-driven call diversion service 118d to the user 102. At step 504, the terminal's user agent 114 enables the user 102 by utilizing the user interface 108 to directly setup and manage the handset-based context-driven call diversion service 118d without interacting with the telecommunication network 104 (FIG. 5A's step 1). For instance, the terminal's user agent 114 enables the user 102 to directly setup and manage the handset-based context-driven call diversion service 118d by allowing the user 102 to indicate one or more situations (criteria) during which if an incoming call is received from a calling party 124 then the incoming call is to be diverted from the user 102 (step 504a). After the enabling step 504, the terminal's user agent 114 at step 506 will at some point in time intercept an incoming call from the calling party 124 (see FIG. 5A's step 3). At step 508, the terminal's user agent 114 determines a status of the user by interfacing with at least one of the information providers 501 on the terminal 100 and possibly remote information providers 503 which are not on terminal 100 (see FIG. 5A's step 4). At step 510, the terminal's user agent 114 compares the status to the one or more situations (criteria) (see FIG. 5A's step 5). If there is a match between the status and the one or more situations (criteria), then the terminal's user agent 114 at step 512 answers the incoming call and informs the calling party 124 that the user 102 is not currently answering calls (see FIG. 5A's step 8). If there is not a match between the status and the one or more situations (criteria), then the terminal's user agent 114 at step 514 alerts the user 102 via the user interface 108 about the incoming call from the calling party 124 (see FIG. 5A's step 11).

V. Handset-Based Hold Before Answer Service 118e (See FIGS. 6A-6B)

Another handset-based service is hold before answer where the user 102 after being alerted about an incoming call selects an option to have the user agent 114 tell the calling party 124 to please wait (e.g. because the user 102 is stuck in a meeting or another conversation). This results in the calling party 124 hearing a special message followed by either silence or "hold music" or a video clip for some period of time. When ready, the user 102 can "answer" the incoming call and speak with the calling party 124. As with the handset-based CRBT service 118*a* and the handset-based voice/video mail services 118*b* and 118*c*, the user agent 114 answers the call on behalf of the user 102. The user agent 114 plays one or more audio/video files to the calling party 124 while the call remains on hold from the standpoint of the user 102. Once the user 102 is ready to answer the call, then the user agent 114 connects the call through to the user 102. An exemplary scenario for providing the handset-based hold before answer service 118*e* to the user 102 is described below with respect to FIGS. 6A-6B.

Referring to FIG. 6A, there is a signal flow diagram illustrating an exemplary way that the handset-based hold before answer service 118*e* can be provided to the user 102 in accordance with an embodiment of the present invention. In this example, the handset-based hold before answer service 118*e* can be provided to the user 102 in accordance with the following steps:

1. The network interface 106 receives a call from a calling party 124.
2. The incoming call triggers the network interface 106 to notify the user agent 114. This notification would typically contain information (e.g., calling party's phone number) about the calling party 124.
3. The user agent 114 alerts the user 102 about the incoming call. This includes the usual visual and/or audible and/or tactile methods for getting the user's attention.
4. The user 102 decides to accept the call but place it on hold before communicating with the calling party 124.
5. The user agent 114 instructs the network interface 106 to answer the call from the calling party 124. Unlike a typical call, the call is not connected to the user interface 108 (e.g., headset or speaker/microphone). Instead the audio paths are configured such that the user agent 114 controls the incoming and outgoing audio.
6. The user agent 114 begins playing an audio (or video) selection (or selections) to the calling party 124. The purpose is to let the calling party 124 know that they have reached the user 102 and that they should continue waiting. This may or may not include an explicit message telling the calling party 124 that they have been placed on hold.
7. Eventually the user 102 answers the call.
8. The user agent 114 ceases the audio/video play out and reroutes the incoming/outgoing media streams to the user 102 (e.g. via the handset microphone and earpiece).
9. At some time later, one of the parties 102 or 124 chooses to end the call. In this example, the user 102 decides to terminate the call. This is indicated to the user agent 114, which in turn disconnects the call between the user 102 and the calling party 124.
10. Call is terminated.

Figure 6B:
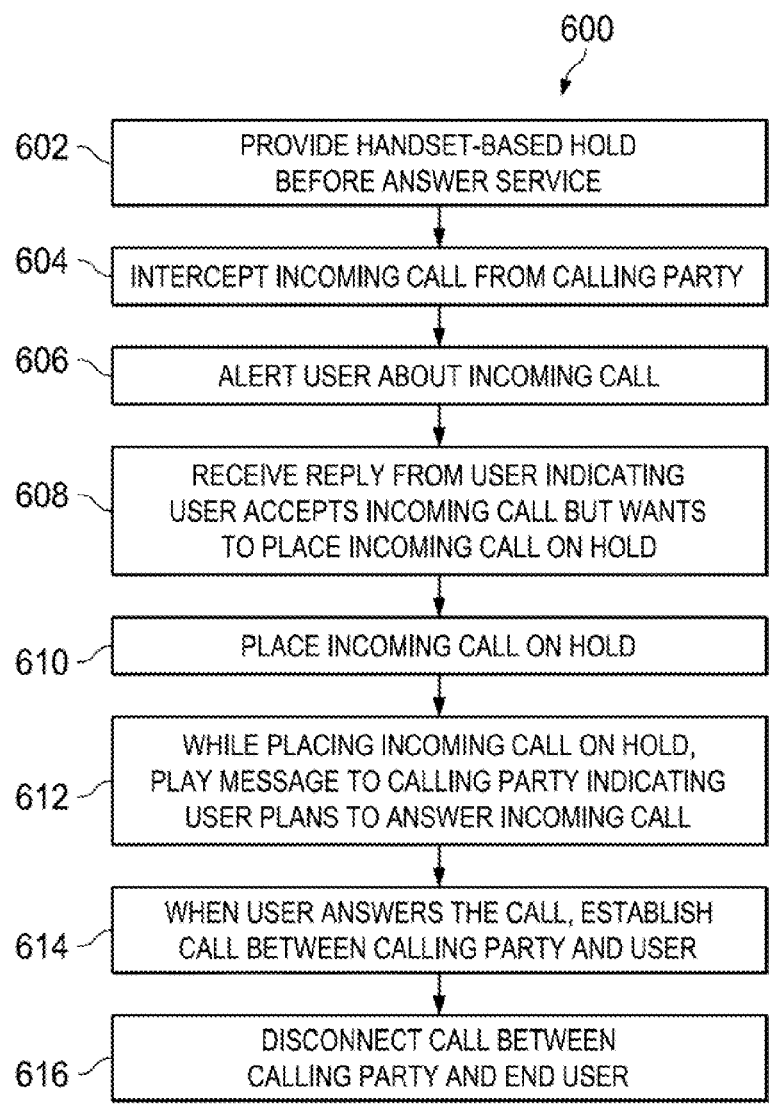
FIG. 6B is a flowchart illustrating an exemplary method which is implemented by the terminal's user agent to provide the handset-based hold before answer service to the user in accordance with an embodiment of the present invention.

Referring to FIG. 6B, there is a flowchart illustrating an exemplary method 600 implemented by the terminal's user agent 114 to provide the handset-based hold before answer service 118*e* to the user 102 in accordance with an embodiment of the present invention. At step 602, the terminal's user agent 114 provides the handset-based hold before answer service 118*e* to the user 102 (note: the user 102 if desired does not necessarily need to setup and manage the handset-based hold before answer service 118*e*). At step 604, the terminal's user agent 114 intercepts an incoming call from a calling party 124 (see FIG. 6A's step 2). At step 606, the terminal's user agent 114 alerts the user 102 via the user interface 108 about the incoming call from the calling party 124 (see FIG. 6A's step 3). At step 608, the terminal's user agent 114 receives a reply from the user 102 indicating that the user 102 accepts the incoming call but wants to place the incoming call on hold before the user 102 communicates with the calling party 124 (see FIG. 6A's step 4). At step 610, the terminal's user agent 114 places the incoming call on hold (see FIG. 6A's step 5). At step 612, the terminal's user agent 114 while placing the incoming call on hold plays a message to the calling party 124 indicating the user 102 plans to answer the incoming call (see FIG. 6A's step 6). At step 614, the terminal's user agent 114 upon the user 102 accepting the call functions to establish the call between the calling party 124 and the user 102 (see FIG. 6A's steps 7-8). At step 616, the terminal's user agent 114 when one of the parties 102 or 124 chooses to end the call will disconnect the call between the calling party 124 and the user 102 (see FIG. 6A's steps 9-10).

VI. Handset-Based Auto Attendant Service 118*f* (See FIG. 7)

Figure 7:
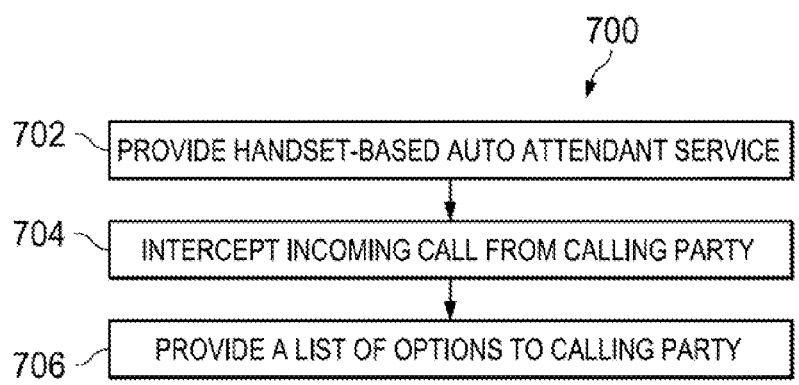
FIG. 7 is a flowchart illustrating an exemplary method which is implemented by the terminal's user agent to provide a handset-based auto attendant (IVR) service to a user in accordance with an embodiment of the present invention.

Referring to FIG. 7, there is a flowchart illustrating an exemplary method 700 implemented by the terminal's user agent 114 to provide the handset-based auto attendant (IVR) service 118*f* to the user 102 in accordance with an embodiment of the present invention. At step 702, the terminal's user agent 114 provides the handset-based auto attendant (IVR) service 118*f* to the user 102 (note: the user 102 if desired does not necessarily need to setup and manage the handset-based auto attendant service 118*f*). At step 704, the terminal's user agent 114 intercepts an incoming call from the calling party 124. At step 706, the terminal's user agent 114 presents the calling party 124 with a list of options. This might include, for example, an option to alert the user 102 that this is an urgent call (e.g. by ringing or buzzing even when the terminal 100 is in silent mode). This might include an option to create a voice-to-text message or to select a canned message from a list of choices to be delivered to the user 102. Since the handset-based auto attendant (IVR) service 118*f* runs directly on the terminal 100, which could be a smartphone, there are numerous other possibilities including giving the option to the calling party 124 to request the location or status (in a meeting, in a moving vehicle, in a noisy environment, etc.) of the user 102—assuming the user 102 has given permission to the user agent 114 to present such options to the calling party 124. A key difference between implementing the handset-based auto attendant (IVR) service 118*f* on the terminal 100 versus using a network-based IVR service is the ease with which the user agent 114 can interact with the calling party 124 and the user 102 simultaneously.

From the foregoing, one skilled in the art will readily appreciate that the present invention involves placing a user agent 114 on the terminal 100 so that the user agent 114 can interact with calling parties 124 on behalf of the user 102. The user agent 114 can provide services that might otherwise reside solely within the telecommunication network 104. At a high level, the present invention is accomplished by providing a hardware-software user agent 114 on the terminal 100 where the user agent 114 intercepts all incoming calls and if needed interacts with the calling party 124 while simultaneously alerting the user 102. The user agent 114 effectively shifts control from the telecommunication network 104 to the terminal 100 and allows the offering of one or more termination-side services 118*a*, 118*b*, 118*c*, 118*d*, 118*e*, 118*f* . . . 118*n* such as personalized ring back and voice messaging that are integrated with the terminal 100 and directly managed by the user 102 (subscriber 102).

Basically, the present invention focuses on the accessibility of termination-side services (e.g. color ringback, voice mail, call screening) from the perspective of the user 102 (subscriber 102). One advantage of the present invention is that it does not necessitate changes in the telecommunication network 104. Instead, the present invention enables various services to be offered directly on the terminal 100 with no special interaction with the telecommunication network 104. However, as discussed above there are circumstances where some of the provided termination-side services (e.g., the handset-based voice mail with network assist service 118*c*, the handset-based context-driven call diversion service 118*d*) may benefit from having the terminal 100 interact with a telecommunications network-based component.

It should be appreciated that various termination-side services 118*a*, 118*b*, 118*c*, 118*d*, 118*e*, 118*f* . . . 118*n* can be provided directly on the end user's terminal 100, even if the terminal 100 supports only traditional circuit-based service (i.e. not IMS). It's worth noting that some IMS networks may in fact restrict early media interactions prior to answer. Thus, by having the user agent 114 answer the call directly, it is possible to bypass these restrictions (with the understanding that the user 102 may be billed for additional minutes of use). Other advantages associated with the present invention include:

Direct control of termination services—e.g., no need to dial into a system or web page to configure the service.

Consolidated user interface 108 so the user 102 can setup and manage multiple features associated with the termination-side services 118*a*, 118*b*, 118*c*, 118*d*, 118*e*, 118*f* . . . 118*n*.

Ability to customize ring duration for different callers or situations. Normally the telecommunication network 104 establishes a fixed ring duration that cannot be modified by the end user 102.

Ability for user 102 to interact with calling party 124 before answer (e.g. by playing custom messages) as described earlier.

Ability to provide advanced IVR functions directly on the user's terminal 100 as described earlier.

Feedback to the calling party 124 that his/her call has reached the desired destination (e.g. in the case of handset-based CRBT or IVR).

The user agent 114 enables media to played to the calling party 124 while the terminal 100 rings where the media can be sourced directly from the terminal 100. For example, a custom ring back tone might be an audio track stored in the user's music library.

The user 102 is able to answer an incoming call at any time, including while the calling party 124 hears a greeting, interacts with a service on the terminal 100, or leaves a message. All the while, the user agent 114 continues to alert the user 102 of the incoming call.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A terminal used by a user and configured to interact with a telecommunication network, the terminal comprising:
a network interface which is configured to interact with the telecommunication network;
a user interface;
a processor; and
a memory that stores processor-executable instructions where the processor interfaces with the memory and executes the processor-executable instructions to implement a user agent that performs the following operations:
provide one or more termination-side services to the user; and
enable, if needed, the user by utilizing the user interface to directly setup and manage the one or more termination-side services without interacting with the telecommunication network;
wherein the one or more termination-side services comprises a handset-based context-driven call diversion service and the user agent performs the following operations:
enable the user by utilizing the user interface to directly setup and manage the handset-based context-driven call diversion service by indicating one or more situations during which if an incoming call is received from a calling party then the incoming call is to be diverted from the user;
after the enable operation, intercept the incoming call from the calling party;
determine a status of the user by interfacing with one or more information providers on the terminal;
compare the status to the one or more situations;
if there is a match between the status and the one or more situations, then answer the incoming call and inform the calling party that the user is not currently answering calls; and
if there is not a match between the status and the one or more situations, then alert the user via the user interface about the incoming call.

2. The terminal of claim 1, wherein the user agent further interfaces with one or more information providers not associated with the terminal to determine the status of the user.

3. A terminal used by a user and configured to interact with a telecommunication network, the terminal comprising:
a network interface which is configured to interact with the telecommunication network;
a user interface;
a processor; and
a memory that stores processor-executable instructions where the processor interfaces with the memory and executes the processor-executable instructions to implement a user agent that performs the following operations:
provide one or more termination-side services to the user; and
enable, if needed, the user by utilizing the user interface to directly setup and manage the one or more termination-side services without interacting with the telecommunication network;
wherein the one or more termination-side services comprises a handset-based voice mail with network assist service and the user agent performs the following operations:
enable the user by utilizing the user interface to directly setup and manage the handset-based voice mail service by recording a default greeting or selecting a pre-recorded greeting from a list to be played to a calling party if an incoming call is received from the calling party;
interact with a network-based voice mail service in the telecommunication network to synchronize user settings and if applicable upload the greeting to be played to the calling party in case the network interface is not able to receive the incoming call from the calling party;

after the enable operation, the interact operation, and if the network interface is able to interact with the telecommunication network, then the user agent performs the following operations:

intercept the incoming call from the calling party;

play the greeting to the calling party;

record a message from the calling party; and while recording the message, play the message to the user and give the user an option to accept the incoming call from the calling party;

after the enable operation, the interact operation, and if the network interface is not able to interact with the telecommunication network, then the telecommunication network redirects the incoming call from the calling party to the network-based voice mail service which plays the greeting to the calling party and records the message from the calling party;

once the network interface is able to interact with the telecommunication network then the user agent performs following operations:

interact with the network-based voice mail service and retrieve, if any, the recorded message associated with the calling party; and alert the user about the retrieved recorded message.

4. The terminal of claim 3, wherein the handset-based voice mail service includes not only voice mail but also video mail where the greeting is either voice or video and the recorded message is either voice or video.

5. A terminal used by a user and configured to interact with a telecommunication network, the terminal comprising:

a network interface which is configured to interact with the telecommunication network;

a user interface;

a processor; and a memory that stores processor-executable instructions where the processor interfaces with the memory and executes the processor-executable instructions to implement a user agent that performs the following operations:

provide one or more termination-side services to the user; and enable, if needed, the user by utilizing the user interface to directly setup and manage the one or more termination-side services without interacting with the telecommunication network;

wherein the one or more termination-side services comprises a handset-based auto attendant service and the user agent does not perform the enable operation but does perform the following operations:

intercept the incoming call from the calling party; and provide a list of options to the calling party.

6. The terminal of claim 5, wherein the list of options comprises an option to alert the user that this is an urgent call.

7. The terminal of claim 5, wherein the list of options comprises an option to create a voice-to-text message.

8. The terminal of claim 5, wherein the list of options comprises an option to select a canned message from a list of choices to be delivered to the user.

9. The terminal of claim 5, wherein the list of options comprises an option to request a location of the user.

10. The terminal of claim 5, wherein the list of options comprises an option to request a status of the user.

11. The terminal of claim 5, wherein the user agent interacts with the calling party and the user simultaneously.

12. A method for offering one or more termination-side services on a terminal used by a user and configured to interact with a telecommunication network, the method implemented by a user agent on the terminal comprising the steps of:

providing one or more termination-side services to the user; and enabling, if needed, the user by utilizing a user interface on the terminal to directly setup and manage the one or more termination-side services without interacting with the telecommunication network;

wherein the one or more termination-side services comprises a handset-based context-driven call diversion service and the user agent performs the following steps:

enabling the user by utilizing the user interface to directly setup and manage the handset-based context-drive call diversion service by indicating one or more situations during which if an incoming call is received from a calling party then the incoming call is to be diverted from the user;

after the enabling step, intercepting the incoming call from the calling party;

determining a status of the user by interfacing with one or more information providers on the terminal;

comparing the status to the one or more situations;

if there is a match between the status and the one or more situations, then answering the incoming call and inform the calling party that the user is not currently answering calls; and if there is not a match between the status and the one or more situations, then alerting the user via the user interface about the incoming call.

13. The method of claim 12, wherein the user agent further interfaces with one or more information providers not associated with the terminal to determine the status of the user.

14. A method for offering one or more termination-side services on a terminal used by a user and configured to interact with a telecommunication network, the method implemented by a user agent on the terminal comprising the steps of:

providing one or more termination-side services to the user; and enabling, if needed, the user by utilizing a user interface on the terminal to directly setup and manage the one or more termination-side services without interacting with the telecommunication network;

wherein the one or more termination-side services comprises a handset-based voice mail with network assist service and the user agent performs the following operations:

enabling the user by utilizing the user interface to directly setup and manage the handset-based voice mail service by recording a default greeting or selecting a pre-recorded greeting from a list to be played to a calling party if an incoming call is received from the calling party;

interacting with a network-based voice mail service in the telecommunication network to synchronize user settings and if applicable upload the greeting to be played to the calling party in case the network interface is not able to receive the incoming call from the calling party;

after the enabling step, the interacting step, and if the network interface is able to interact with the telecommunication network, then the user agent performs the following steps:

intercepting the incoming call from the calling party;

playing the greeting to the calling party;

recording a message from the calling party; and while recording the message, playing the message to the user and giving the user an option to accept the incoming call from the calling party;

after the enabling step, the interacting step, and if the network interface is not able to interact with the telecommunication network, then the telecommunication network redirects the incoming call from the calling party to the network-based voice mail service which plays the greeting to the calling party and records the message from the calling party;

once the network interface is able to interact with the telecommunication network then the user agent performs following steps:

interacting with the network-based voice mail service and retrieving, if any, the recorded message associated with the calling party; and alerting the user about the retrieved recorded message.

15. The method of claim 14, wherein the handset-based voice mail service includes not only voice mail but also video mail where the greeting is either voice or video and the recorded message is either voice or video.

16. A method for offering one or more termination-side services on a terminal used by a user and configured to interact with a telecommunication network, the method implemented by a user agent on the terminal comprising the steps of:

providing one or more termination-side services to the user; and enabling, if needed, the user by utilizing a user interface on the terminal to directly setup and manage the one or more termination-side services without interacting with the telecommunication network;

wherein the one or more termination-side services comprises a handset-based auto attendant service and the user agent does not perform the enabling step but does perform the following steps:

intercepting the incoming call from the calling party; and providing a list of options to the calling party.

17. The method of claim 16, wherein the list of options comprises an option to alert the user that this is an urgent call.

18. The method of claim 16, wherein the list of options comprises an option to create a voice-to-text message.

19. The method of claim 16, wherein the list of options comprises an option to select a canned message from a list of choices to be delivered to the user.

20. The method of claim 16, wherein the list of options comprises an option to request a location of the user.

21. The method of claim 16, wherein the list of options comprises an option to request a status of the user.

22. The method of claim 16, wherein the user agent interacts with the calling party and the user simultaneously.

* * * * *

UNITED STATES PATENT AND TRADEMARK OFFICE
CERTIFICATE OF CORRECTION

| | | |
|---|---|---|
| PATENT NO. | : 8,917,834 B2 | Page 1 of 1 |
| APPLICATION NO. | : 13/546136 | |
| DATED | : December 23, 2014 | |
| INVENTOR(S) | : Cohn | |

It is certified that error appears in the above-identified patent and that said Letters Patent is hereby corrected as shown below:

In the specification

In Column 8, Line 29, delete "user aunt" and insert -- user agent --, therefor.

Signed and Sealed this
Seventh Day of June, 2016

Michelle K. Lee
*Director of the United States Patent and Trademark Office*